United States Patent
Weng et al.

(10) Patent No.: US 7,773,471 B2
(45) Date of Patent: Aug. 10, 2010

(54) RECORDING APPARATUS AND RECORDING METHOD

(75) Inventors: Yih-Shin Weng, Hsinchu County (TW); Wen-Yi Wu, Hsinchu County (TW); Hong-Ching Chen, Kaohsiung County (TW)

(73) Assignee: Mediatek Inc., Hsin-Chu (TW)

( * ) Notice: Subject to any disclaimer, the term of this patent is extended or adjusted under 35 U.S.C. 154(b) by 571 days.

(21) Appl. No.: 11/532,543

(22) Filed: Sep. 18, 2006

(65) Prior Publication Data
US 2007/0070830 A1      Mar. 29, 2007

(30) Foreign Application Priority Data
Sep. 23, 2005   (TW)   ............... 94133185 A

(51) Int. Cl.
G11B 27/10 (2006.01)
G11B 7/00 (2006.01)
(52) U.S. Cl. ............... 369/47.34; 369/124.08
(58) Field of Classification Search ............ None
See application file for complete search history.

(56) References Cited

U.S. PATENT DOCUMENTS 4,698,810 A * 10/1987 Fukuda et al. ........... 714/758
5,373,493 A * 12/1994 Iizuka ................... 369/124.14
6,795,893 B2    9/2004 Wu et al.
2008/0062829 A1 * 3/2008 Yang ................... 369/47.1

FOREIGN PATENT DOCUMENTS

KR    1020040082748 A    9/2004

OTHER PUBLICATIONS

English language abstract of KR 10-2004-0082748.

* cited by examiner

Primary Examiner—Peter Vincent Agustin
(74) Attorney, Agent, or Firm—Thomas, Kayden, Horstemeyer & Risley

(57) ABSTRACT

A recording apparatus and a recording method are provided. Control information is generated by the microcontroller based on the received command. The data preparing unit has a control register and a preparing circuit, wherein the control register is used for storing a set of control register values corresponding to the control information, and the preparing circuit is used for generating prepared data based on the set of control register values and storing the prepared data in the data buffer. The recording circuit records on an optical storage media based on the prepared data. The optical storage media has a lead-in area having a plurality of continuous zones. The prepared data includes a plurality of data to be written into the corresponding zones and the plurality of data are stored in the data buffer in the same sequence as the writing sequence to the zones and are read continuously.

29 Claims, 10 Drawing Sheets

RECORDING APPARATUS AND RECORDING METHOD

This application claims the benefit of Taiwan application Serial No. 94133185, filed Sep. 23, 2005, the subject matter of which is incorporated herein by reference.

BACKGROUND OF THE INVENTION

1. Field of the Invention

The invention relates in general to the recording apparatus, and more particularly to a recording apparatus and recording method that simplify the pointer control of the prepared data to be recorded.

2. Description of the Related Art

FIG. 1 is a diagram of the data layout of a conventional DVD (Digital Versatile Disc/Disk) of one example. The DVD has a lead-in area, a data area and a lead-out area. The lead-in area is located at the area of a lower address, and the lead-out area is located at the area of a higher address. The lead-in area includes multiple continuous zones, such as a reserved zone, a reference code zone, a buffer zone 1, a control data zone, and a buffer zone 2. The contents of the reserved zone, the buffer zone 1 and the buffer zone 2 are 0, the content of the reference code zone is a specific data pattern, and the content of the control data zone is the physical information and other relating information of DVD.

While DVD recorder records data into DVD, the data that is to be recorded is first stored in a data buffer, such as a DRAM (Dynamic Random Access Memory). FIG. 2 is a diagram of the data allocation of the data buffer while DVD recorder records the data into DVD. The data buffer has three areas A1, A2 and A3 to store the data for the reserved zone/buffer zone (in which the content is zero), for the reference code zone and for the control data zone, respectively. The data at the different address are read by the control of a recording pointer RP. The recording pointer RP is directed to the address of the data for the reserved zone or buffer zone while recording data to the reserved zone, the buffer zone 1 and the buffer zone 2, since the contents of the reserved zone, the buffer zone 1 and buffer zone 2 are all to be zero.

FIG. 3 is a block diagram of part of a conventional recorder. The conventional recorder includes at least a data buffer management unit 302, a recording circuit 304 and a coding control unit 306. The data buffer management unit 302 is used for controlling data buffer. The recording circuit 304 is used for controlling a recordable optical disk driver for processing recording. The coding control unit 306 is used for controlling the recording pointer RP. Since the data addresses for the reserved zone, the buffer zones (for which the data is zero), the reference code zone and the control data zone in the disk are not continuous, the coding control unit 306 has to make the recording pointer RP point to the area A1, then to the area A2, and then to the areas A1, A3 and A1 sequentially while recording. However, the circuit design of the coding control 306 is too complicated and thus the efficiency is lowered.

SUMMARY OF THE INVENTION

It is therefore an object of the invention to provide a recording apparatus and method without complicated pointer control so as to simplify the circuit design and enhance the efficiency.

The invention achieves the above-identified objects by providing a recording apparatus electronically connected to a data buffer. The recording apparatus includes an interface circuit, a microcontroller, a control buffer, a data preparing unit, a buffer management unit, and a recording circuit. The interface circuit receives a command from a host. The microcontroller generates control information based on the command. The control buffer stores the control information. The data preparing unit has a control register and a preparing circuit, wherein the control register is used for storing a set of control register values generated based on the control information, and the preparing circuit is used for generating prepared data based on the set of control register values and storing the prepared data in the data buffer. The buffer management unit accesses the data buffer. The recording circuit receives the prepared data from the buffer management unit and records on an optical storage media. The optical storage media has a lead-in area having a plurality of continuous zones. The prepared data includes a plurality of data to be written into the corresponding zones, and the plurality of data are stored in the data buffer in the same sequence as the writing sequence to the zones and are read continuously.

Other objects, features, and advantages of the invention will become apparent from the following detailed description of the preferred but non-limiting embodiments. The following description is made with reference to the accompanying drawings.

DETAILED DESCRIPTION OF THE INVENTION

In the invention, the data corresponding to the continuous zones in the lead-in area of the disk is continuous stored in the data buffer and is read in the same sequence so as to simplify the control of the recording pointer and enhance the efficiency.

First Embodiment

Figure 4:
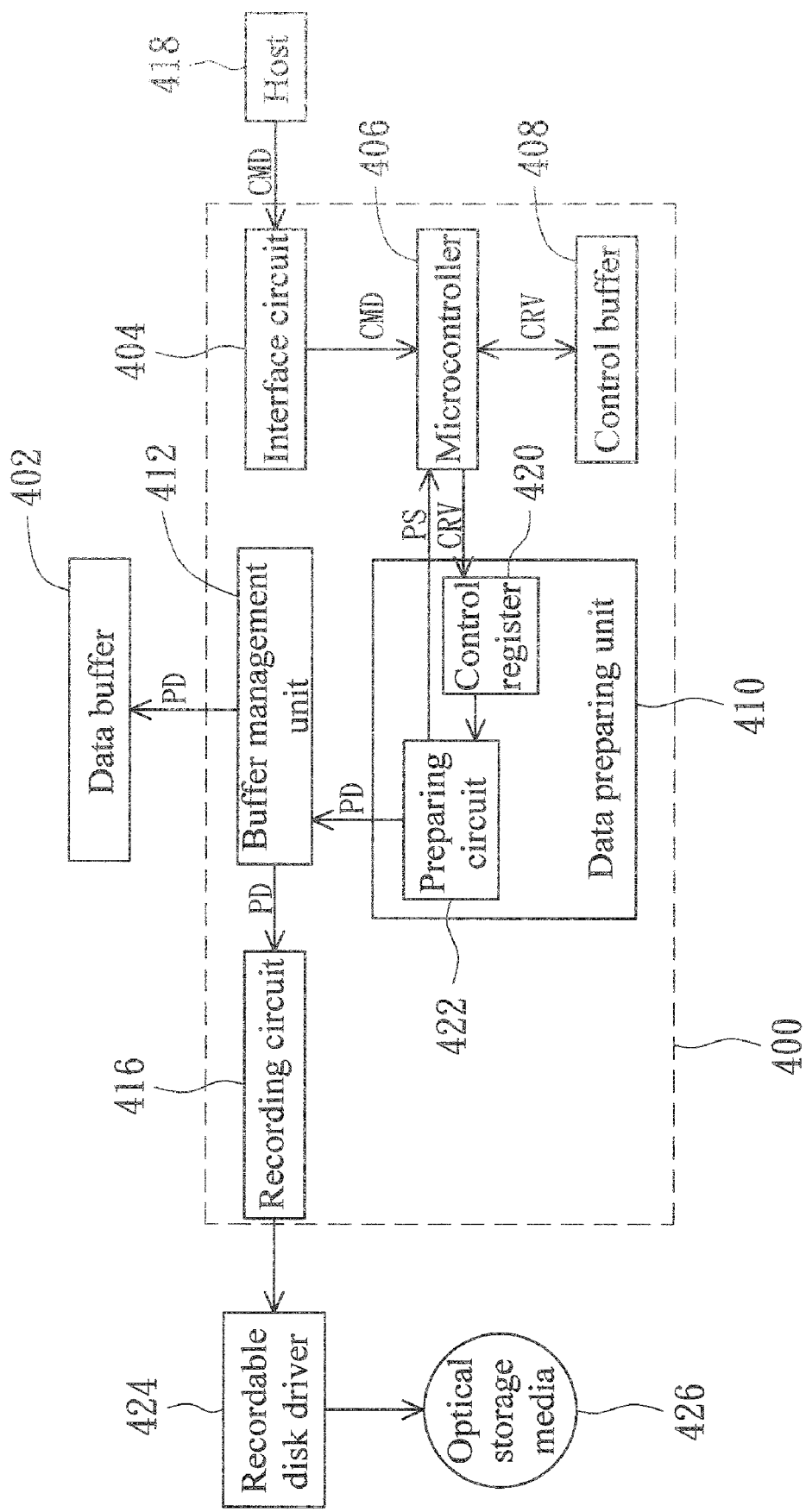
FIG. 4 is a block diagram of a recording apparatus according to a first embodiment of the invention.

FIG. 4 is a block diagram of a recording apparatus according to a first embodiment of the invention. The recording apparatus 400 is connected to a data buffer 402. The recording apparatus 400 includes an interface circuit 410 a microcontroller 406, a control buffer 408, a data preparing unit 410, a buffer management unit 412, and a recording circuit 416. The interface circuit 404 is used for receiving a command CMD from a host 418. The microcontroller 406 is used for generating control information based on the command CMD. The control buffer is used for storing the control information. The data preparing unit 410 has a control register 420 and a preparing circuit 422. The control register 420 is used for storing a set of control register values CRV corresponding to the control information. The preparing circuit 422 generates prepared data PD, which is then stored in the data buffer 402, based on the set of control register values CRV. The buffer management unit 412 is used for accessing the data buffer 402. The recording circuit 416 is used for receiving the prepared data PD from the buffer management unit 412 and for processing recording on the optical storage media 426.

The optical storage media 426 has a lead-in area having multiple continuous zones. The prepared data PD includes a plurality of data to be written to the corresponding zones respectively. The plurality of data is stored in the data buffer in the same sequence as it is written to the zones of the optical storage media 426 and is read from the data buffer continuously.

Figure 5:
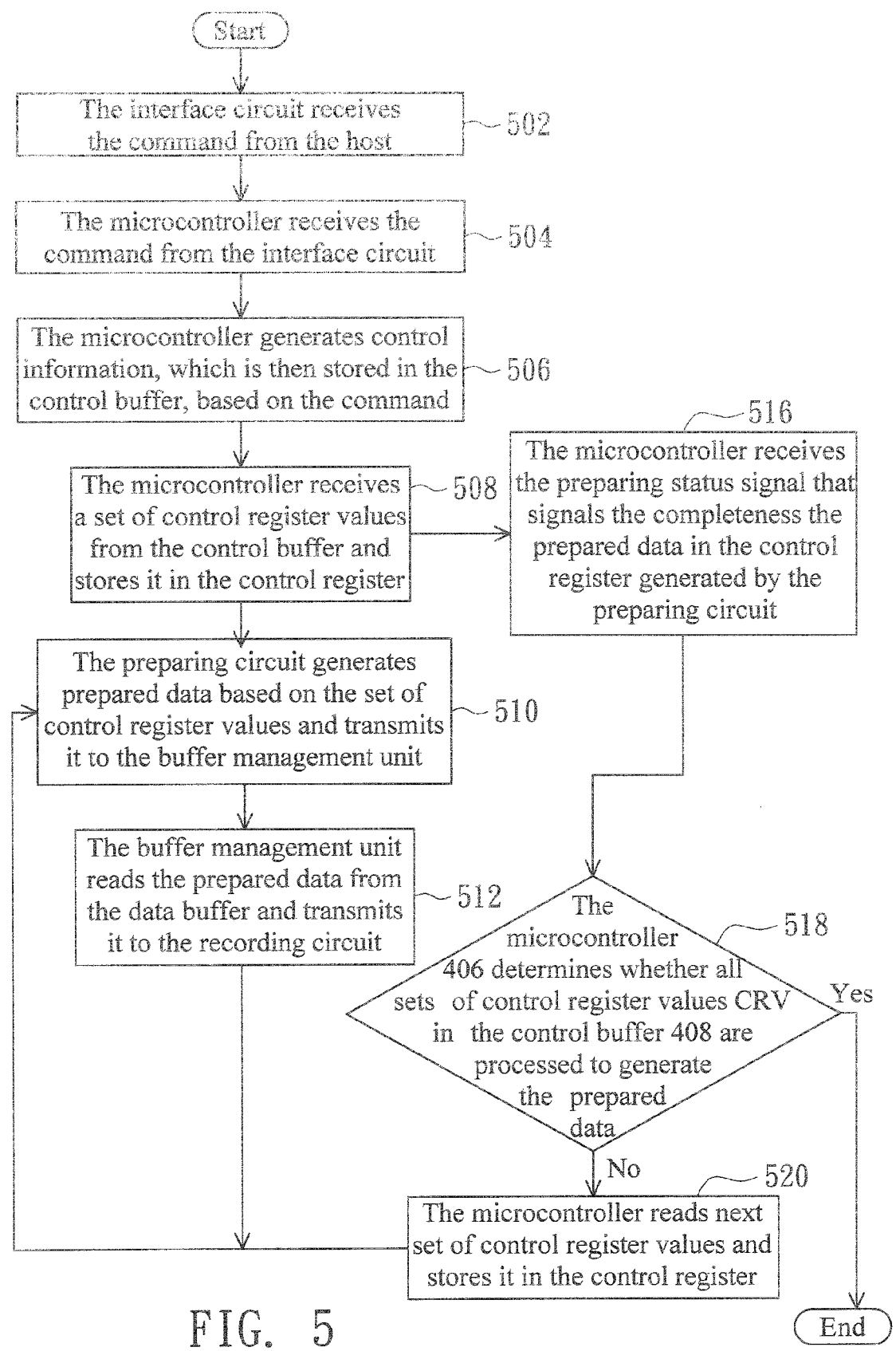
FIG. 5 is a flowchart of the recording method performed by the recording apparatus of the first embodiment of the invention.

FIG. 5 is a flowchart of the recording method performed by the recording apparatus 400 of the first embodiment of the invention. First, step 502 is performed to receive the command CMD from the host 418 by the interface circuit 404. Then the microcontroller 406, in step 504, receives the command CMD from the interface circuit 404, and then, in step 506, generates control information, which is then stored in the control buffer based on the command CMD. A set of control register values CRV is preferably generated by the microcontroller 406 based on the control information stored in the control buffer 408. In this embodiment, the microcontroller 406 makes the control information in the form of at least a set of control register values CRV, and preferably multiple sets of control register values CRV. For example, the multiple sets of control register values CRV records the addresses, data types and lengths of the lead-in area, the data area and the lead-out area and further records that of the zones in the lead-in area.

Next, the microcontroller 406 receives the set of control register values CRV from the control buffer 408 and stores it in the control register 420 of the data preparing unit 410 in step 508. Then, in step 510, the preparing circuit 422 of the data preparing unit 410 generates prepared data PD based on the set of control register values CRV and transmits it to the buffer management unit 412. The buffer management unit 412 stores the prepared data PD in the data buffer 402, an external DRAM outside the recording apparatus 400 for example. After the prepared data PD is generated, the preparing circuit 422 outputs a preparing status signal PS to the microcontroller 406 for interruption. Then, the microcontroller 406 performs steps 516-520 in sequence and simultaneously performs step 512.

In step 512, the buffer management unit 412 reads the prepared data PD from the data buffer 402 and transmits it to the recording circuit 416. The recording circuit 416 records the prepared data PD to the optical storage media 426 by control of the recordable disk driver 424. The optical storage media 426 is for example a recordable disk, and preferably a recordable DVD.

In step 516, the microcontroller 406 receives the preparing status signal PS that signals the completeness of the prepared data PCD by the preparing circuit 422 based on the set of control register values CRV corresponding to the control register 420. Then, in step 518, the microcontroller 406 determines whether all sets of control register values CRV in the control buffer 408 are processed to generate the prepared data: if yes, the method ends, else step 520 is performed. In step 520, the microcontroller 406 reads next set of control register values CRV and stores it in the control register 420. Then, step 510 is returned and the preparing circuit 422 of the data preparing unit 410 generates another prepared data PD based on this next set of control register values CRV, and transmit the prepared data PD to the buffer management unit 412. Then the recording circuit 416 records this next prepared data PD on the optical storage media 426.

Figure 6:
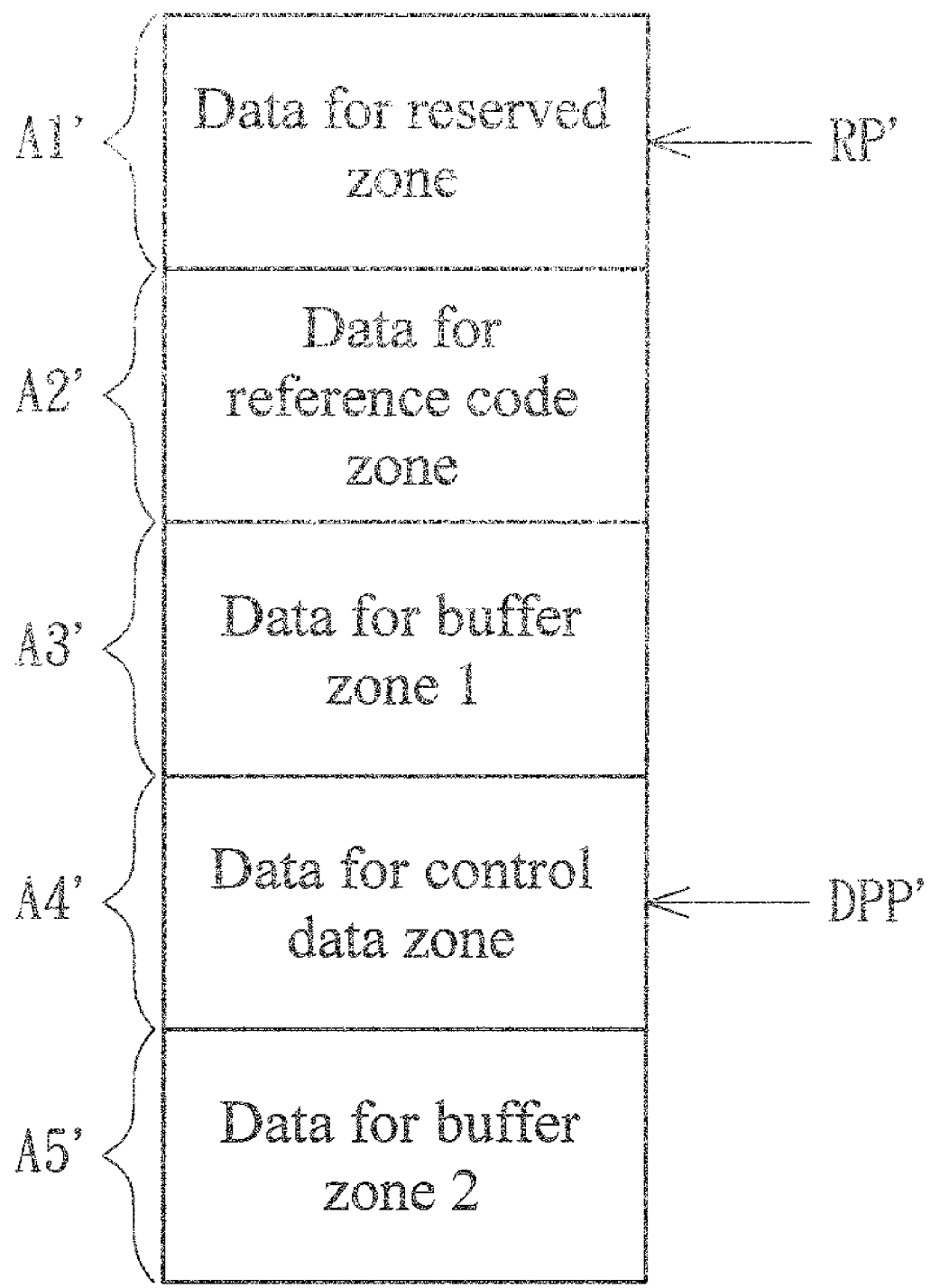
FIG. 6 is a diagram of allocation of the prepared data stored in the data buffer while the recording apparatus of the first embodiment of the invention is recording on the recordable DVD.

FIG. 6 is a diagram of allocation of the prepared data PD stored in the data buffer 402 while the recording apparatus 400 of the first embodiment of the invention is recording on the recordable DVD. The preparing circuit 422 makes the buffer management unit 412 to read the data at the different addresses in the data buffer 402 by control of a recording pointer RP', and write data to the different addresses in the data buffer 402 by control of a data preparing pointer DPP'. The prepared data AD includes five data, for example, stored in the five areas A1'-A5' of the data buffer 402 respectively. The five areas A1'-A5' respectively store the data for the reserved zone, reference code zone, buffer zone 1, control data zone, and buffer zone 2. These data are to be written into the corresponding zones respectively. These data are stored in the data buffer 402 in the sequence as the written sequence and are read continuously.

Figure 1:
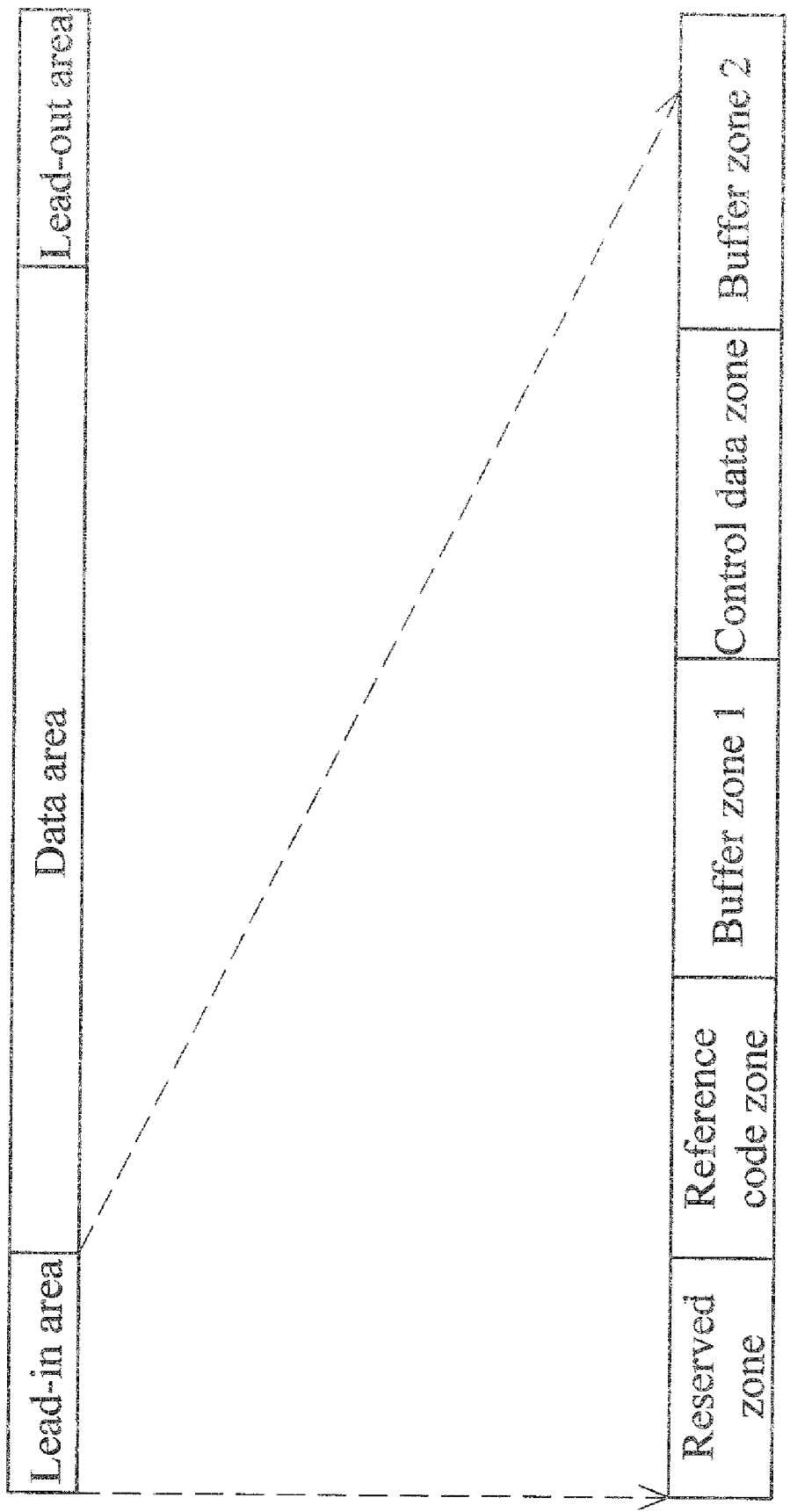
FIG. 1 is a diagram of the data layout of a conventional DVD (Digital Versatile Disc/Disk) of one example.
Figure 2:
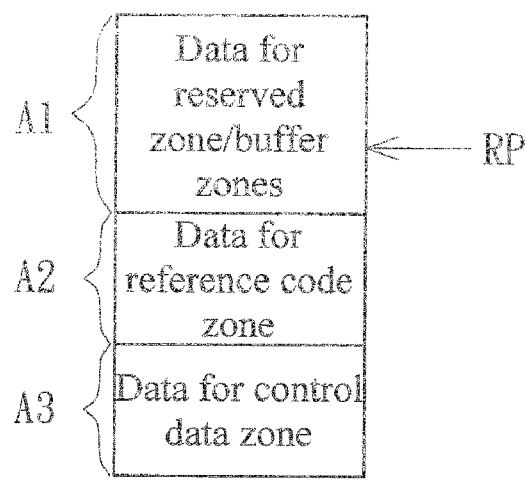
FIG. 2 is a diagram of the data allocation of the data buffer while DVD recorder records into DVD.
Figure 3:
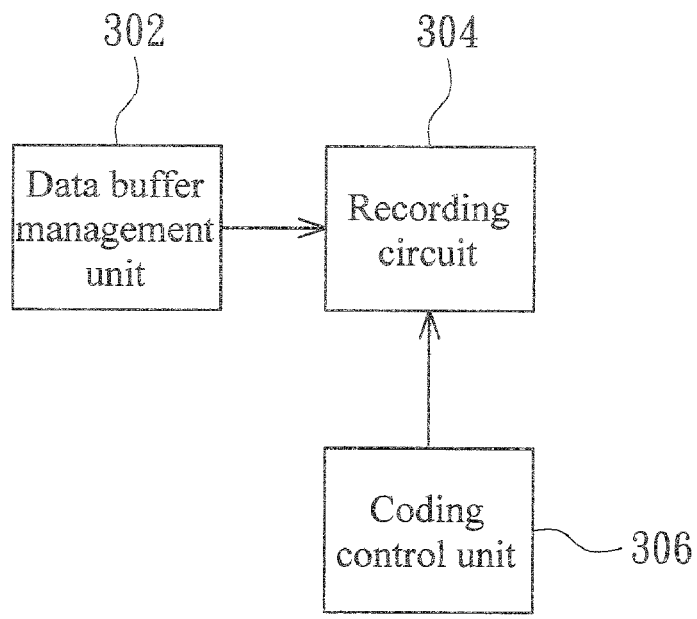
FIG. 3 is a block diagram of part of a conventional recorder.

That is, since the lead-in area of the recordable DVD shown in FIG. 1 has the reserved zone, the reference code zone, the buffer zone 1, the control data zone and the buffer zone 2 in sequence, the preparing circuit 422 stores the prepared data PD continuously in the data buffer 402 in the same sequence. And then in that sequence the prepared data PD in the data buffer 402 is written on the recordable DVD. Therefore, it is only the data preparing pointer DPP' that the preparing circuit 422 controls continuously so as to store the prepared data PD to the data buffer 402. While recording, it is only the recording pointer RP' that the preparing circuit 422 controls continuously to read the five data. The control of recording pointer RP' is much simpler than the conventional control shown in FIG. 2 such that the circuit design is simplified and the recording efficiency is enhanced.

Second Embodiment

Figure 7:
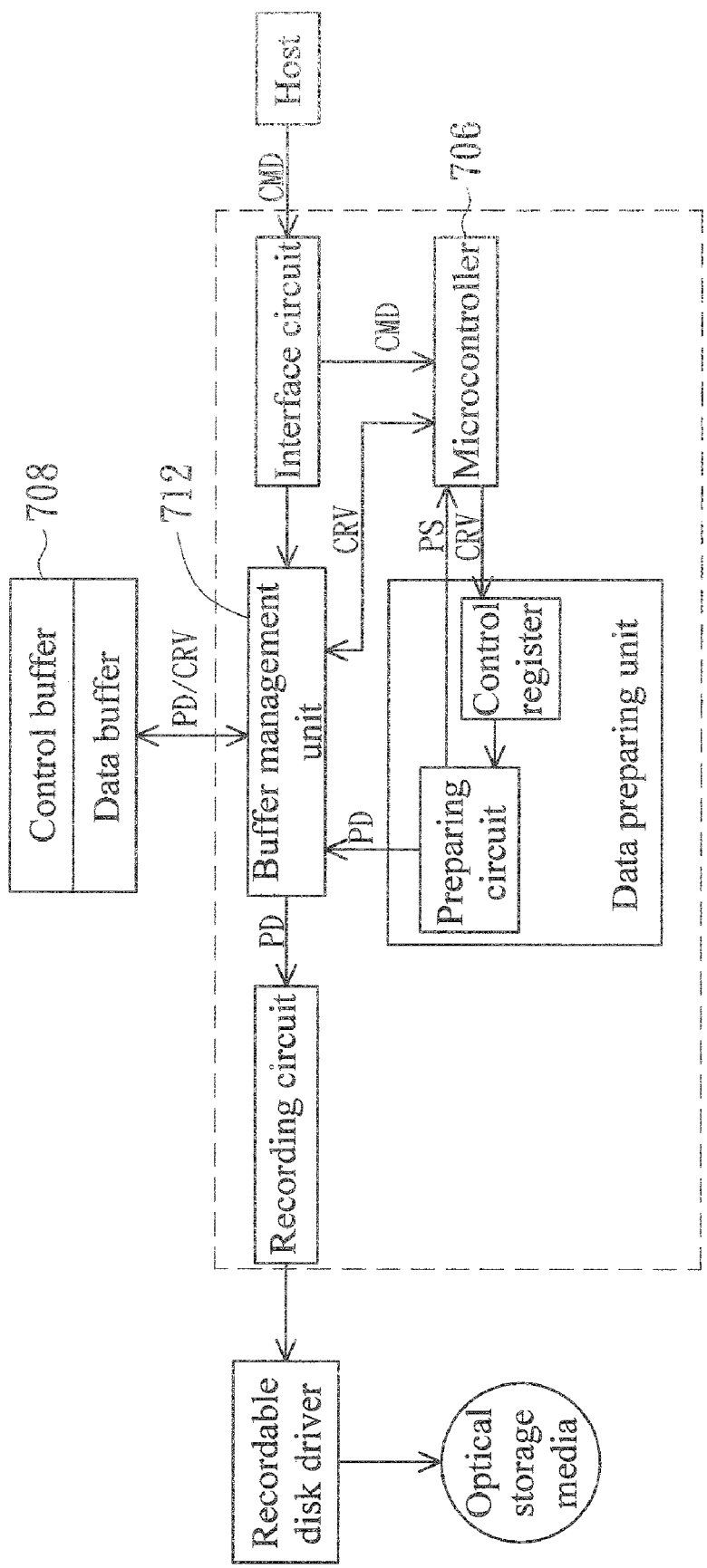
FIG. 7 is a block diagram of a recording apparatus according to a second embodiment of the invention.

FIG. 7 is a block diagram of a recording apparatus according to a second embodiment of the invention. Different from the recording apparatus of the first embodiment, the control buffer 708 of the recording apparatus of the second embodiment is controlled by the buffer management unit 712 such that the microcontroller 706 accesses the control buffer 708 via the buffer management unit 712.

Third Embodiment

Figure 8:
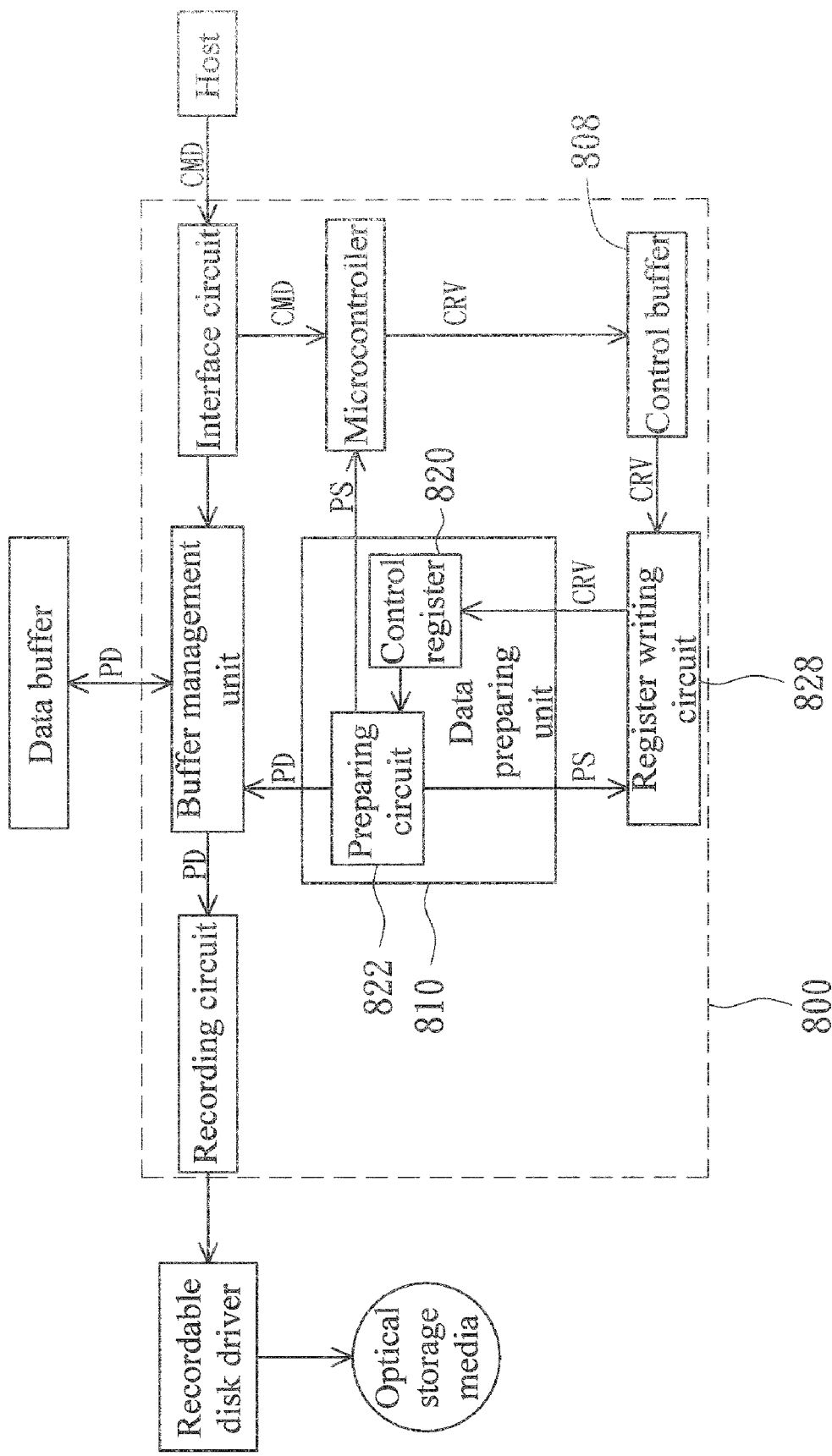
FIG. 8 is a block diagram of a recording apparatus according to a third embodiment of the invention.

FIG. 8 is a block diagram of a recording apparatus according to a third embodiment of the invention. Different from the recording apparatus of the first embodiment, the recording apparatus 800 of the third embodiment further includes a register writing circuit 828 for writing the at least one set of control register values CRV into the control register 820 of the data preparing circuit 810 based on the control information stored in the control buffer 808. The data preparing unit 810 outputs the preparing status signal PS to the register writing circuit 828 after the generation of the prepared data PD by the preparing circuit 822 based on the set of control register values CRV stored in the control register 820. The register writing circuit 828 determines whether the generation of all the prepared data PD based on all sets of control register values CRV is finished: if not, the register writing circuit 828 reads a next set of control register values CRV from the control buffer 808 and saves it to the control register 820.

Fourth Embodiment

Figure 9:
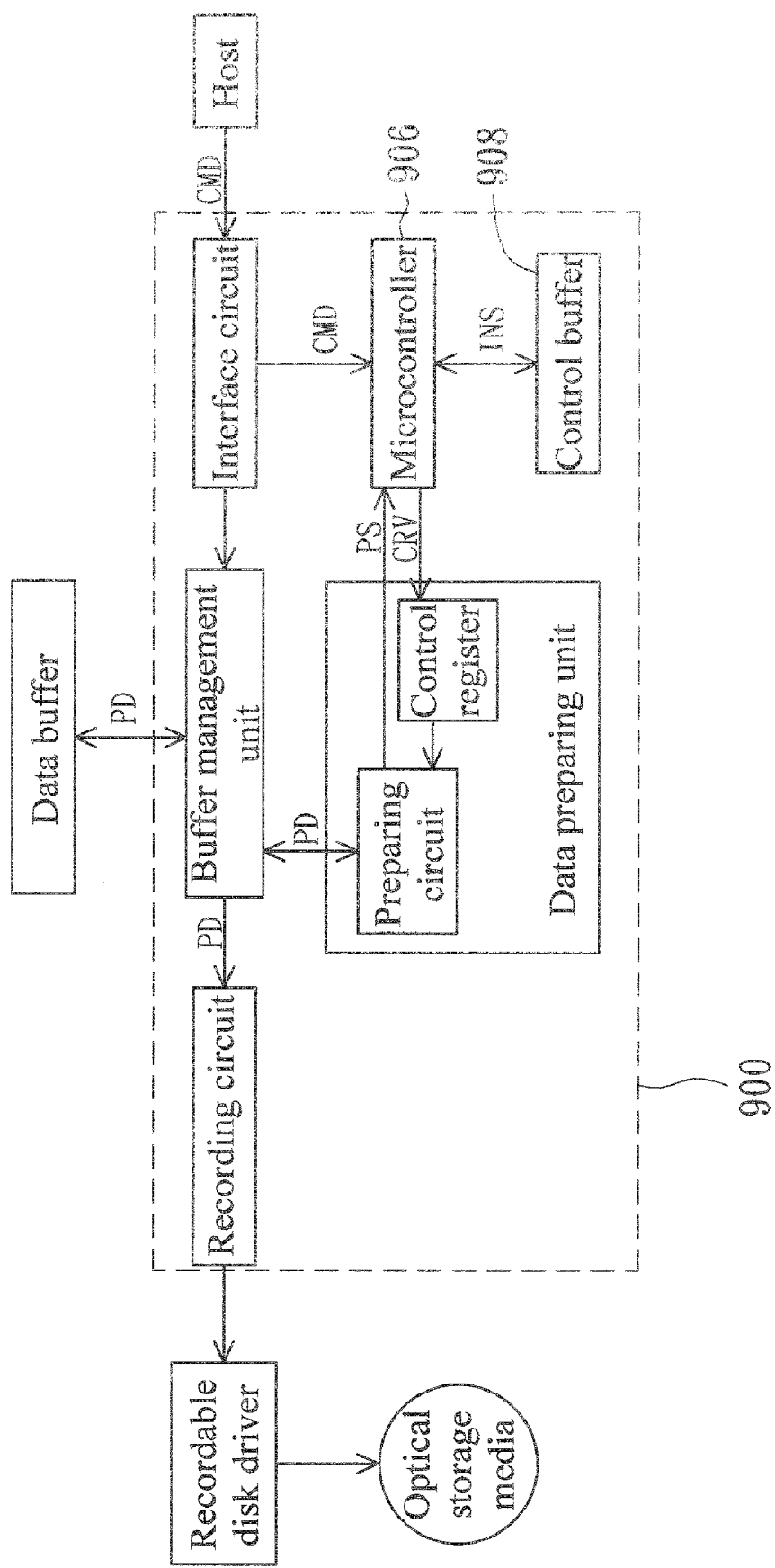
FIG. 9 is a block diagram of a recording apparatus according to a fourth embodiment of the invention.

FIG. 9 is a block diagram of a recording apparatus according to a fourth embodiment of the invention. Different from the recording apparatus in the first embodiment, the control information is corresponding to an instruction INS of the command CMD in the recording apparatus 900 in the fourth embodiment. The set of control register values CRV is generated by the microcontroller 906 based on the instruction INS stored in the control buffer 908.

The size of the instruction INS is smaller than that of a set of control register values CRV such that the size of the control buffer 908 is smaller than that of the control buffer 408 in the first embodiment shown in FIG. 4.

Fifth Embodiment

Figure 10:
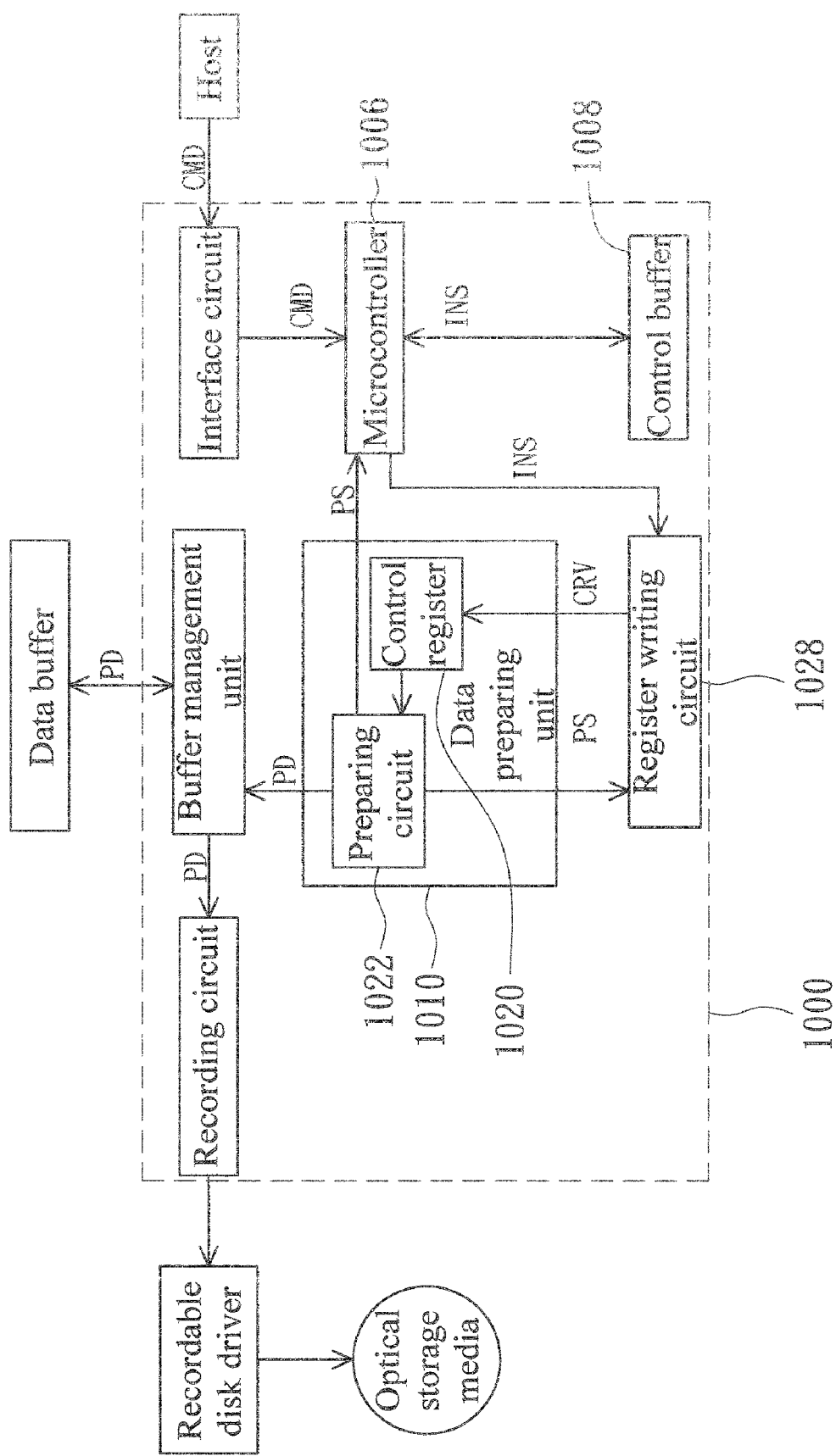
FIG. 10 is a block diagram of a recording apparatus according to a fifth embodiment of the invention.

FIG. 10 is a block diagram of a recording apparatus according to a fifth embodiment of the invention. Different from the fourth embodiment, the recording apparatus 1000 in the fifth embodiment further includes a register writing circuit 1028. The microcontroller 1006 transfers the control information, the at least one instruction INS, stored in the control buffer 1008 to the register writing circuit 1028, which then generates the set of control register values CRV based on the received control information. The preparing circuit 1022 of the data preparing unit 1010 stores the set of control register values CRV into the control register 1020 and thus generates the prepared data PD. After the generation of the prepared data PD, the preparing circuit 1022 outputs a preparing status signal PS to the microcontroller 1006 for determination of whether the generation of all the prepared data PD is done: if not, the microcontroller 006 reads the next instruction INS from the control buffer 1008 and sends it to the register writing circuit 1028.

Different from the fourth embodiment, the microcontroller 1006 in the fifth embodiment does not need to generate the at least one set of control register values CRV such that the loading of the microcontroller 1006 is lightened.

Sixth Embodiment

Figure 11:
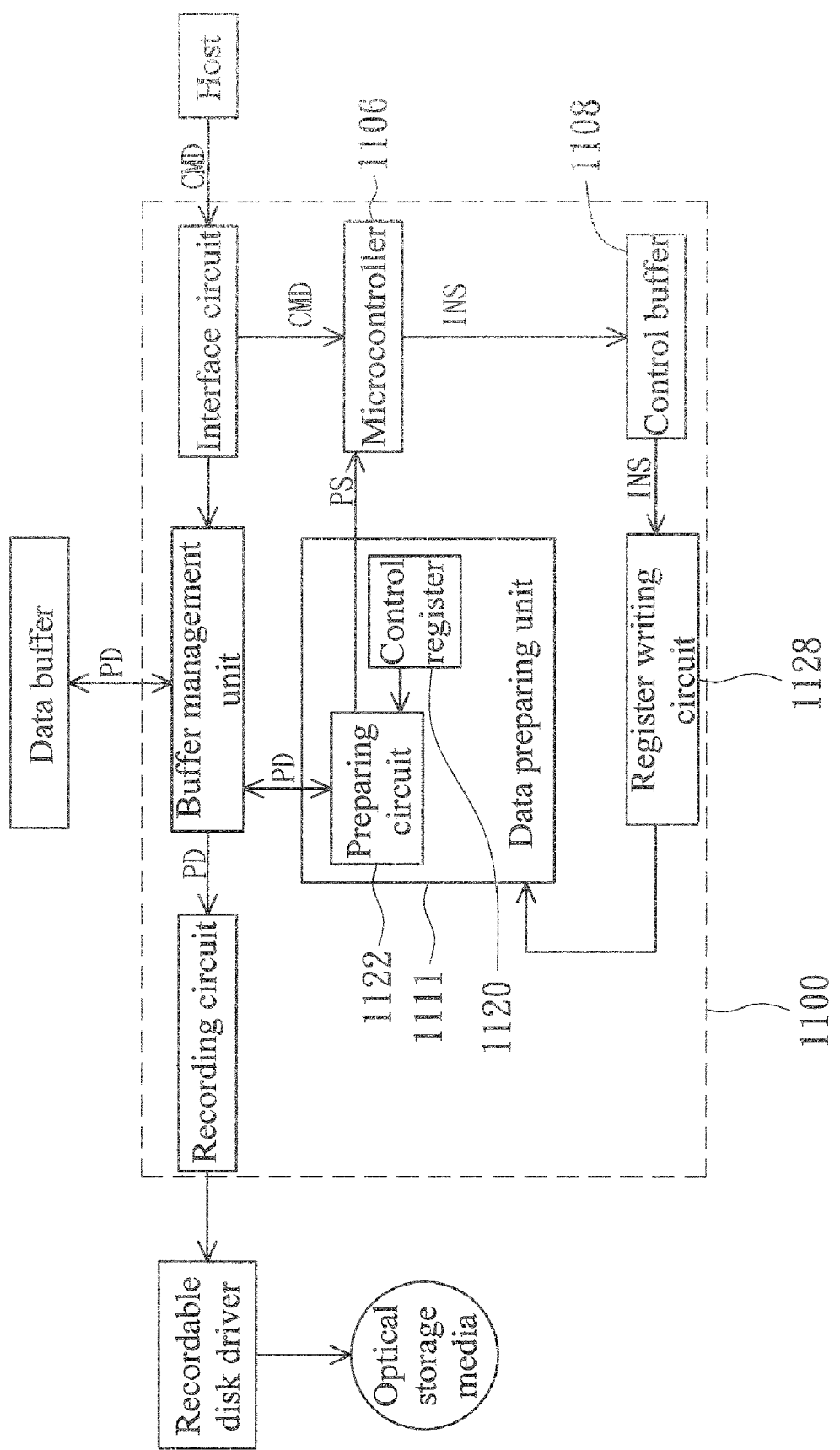
FIG. 11 is a block diagram of a recording apparatus according to a sixth embodiment of the invention.

FIG. 11 is a block diagram of a recording apparatus according to a sixth embodiment of the invention. Different from the fifth embodiment, the register writing circuit 1128 reads the instruction INS directly from the control buffer 1108 to generate the corresponding control register values CRV such that the loading of the microcontroller 1106 is further lightened.

The recording apparatus of the embodiments generates the prepared data that is to be written on the disk by the data preparing unit. The addresses of the prepared data are stored in the data buffer continuously and in the same sequence as that while writing respectively on the continuous zones in the lead-in area of the disk. The control of the recording pointer is thus simplified, the speed of reading the prepared data is quickened, and the recording efficiency is enhanced.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A recording apparatus electronically connected to a data buffer, the recording apparatus comprising:
   an interface circuit for receiving a command from a host;
   a microcontroller for generating control information based on the command;
   a control buffer for storing the control information;
   a data preparing unit having a control register and a preparing circuit, the control register values being used for storing a set of control register values, the set of control register being corresponding to the control information, the preparing circuit being used for generating prepared data based on the set of control register values, and the prepared data being stored in the data buffer;
   a buffer management unit for accessing the data buffer; and
   a recording circuit for receiving the prepared data from the buffer management unit and recording on an optical storage media;
   wherein the optical storage media has a lead-in area having a plurality of continuous zones, the prepared data includes a plurality of data to be written into the corresponding zones, the plurality of data are stored in the data buffer in the same sequence as the writing sequence to the zones and are read continuously.

2. The recording apparatus according to claim 1, wherein the control information is at least an instruction corresponding to the command.

3. The recording apparatus according to claim 1, wherein the control information is the set of the control register values.

4. The recording apparatus according to claim 1, wherein the set of control register values is generated by the microcontroller according to the control information stored in the control buffer.

5. The recording apparatus according to claim 4, wherein the preparing circuit of the data preparing unit outputs a preparing status signal to the microcontroller after the generation of the prepared data based on the set of control register values stored in the control register.

6. The recording apparatus according to claim 1, further comprising:
   a register writing circuit for writing the set of control register values to the control register based on the control information stored in the control buffer.

7. The recording apparatus according to claim 6, wherein the preparing circuit outputs a preparing status signal to the register writing circuit after the generation of the prepared data by the preparing circuit of the data preparing unit based on the set of control register values stored in the control register.

8. The recording apparatus according to claim 1, further comprising:
   a register writing circuit, to which the control information in the control buffer being transferred by the microcontroller, the register writing circuit writing the set of control register values to the control register based on the received control information.

9. The recording apparatus according to claim 8, wherein the preparing circuit of the data preparing unit outputs a preparing status signal to the microcontroller after the generation of the prepared data based on the set of control register values in the control register.

10. The recording apparatus according to claim 1, wherein the control buffer is controller by the buffer management unit.

11. A recording method comprising:
    receiving a command from a host;
    generating control information based on the command;

generating a prepared data based on a set of control register values, wherein the set of control register values corresponds to the control information; and recording on an optical storage disk based on the prepared data;

wherein the optical storage disk has a lead-in area having a plurality of continuous zones, the prepared data includes a plurality of data to be written into the corresponding zones, the plurality of data are stored in a data buffer in the same sequence as the writing sequence to the zones and are read continuously.

12. A recording apparatus comprising:

an interface circuit for receiving a command from a host;

a microcontroller for generating control information according to the command;

a control buffer for storing the control information;

a control register for storing a set of control register values, wherein the set of control register values correspond to the control information;

a preparing circuit for generating prepared data according to the set of control register values and transferring the prepared data to a data buffer;

a buffer management unit for accessing the data buffer; and a recording circuit for receiving the prepared data from the buffer management unit and recording the prepared data on an optical storage media.

13. The recording apparatus according to claim 12, wherein the control information is at least an instruction corresponding to the command.

14. The recording apparatus according to claim 12, wherein the control information is the set of the control register values.

15. The recording apparatus according to claim 12, wherein the set of control register values is generated by the microcontroller according to the control information stored in the control buffer.

16. The recording apparatus according to claim 12, wherein the preparing circuit outputs a preparing status signal to the microcontroller after generating the prepared data.

17. The recording apparatus according to claim 12, further comprising:

a register writing circuit for writing the set of control register values to the control register.

18. The recording apparatus according to claim 17, wherein the preparing circuit outputs a preparing status signal to the register writing circuit after generating the prepared data.

19. The recording apparatus according to claim 17, wherein the set of control register values is generated by the register writing circuit according to the control information stored in the control buffer.

20. The recording apparatus according to claim 17, wherein the register writing circuit receiving the control information from the microcontroller.

21. The recording apparatus according to claim 12, wherein the optical storage media has a plurality of zones, the prepared data includes a plurality of data to be written into the corresponding zones.

22. The recording apparatus according to claim 12, wherein the control buffer is controlled by the buffer management unit.

23. A recording method comprising:

receiving a command from a host;

generating control information according to the command;

generating a prepared data according to a set of control register values, wherein the set of control register values is generated by a microcontroller according to the control information; and recording the prepared data on an optical storage media.

24. The recording method according to claim 23, wherein the control information is at least an instruction corresponding to the command.

25. The recording method according to claim 23, wherein the control information is the set of the control register values.

26. The recording method according to 23, wherein the microcontroller receiving a preparing status signal after the prepared data has been generated.

27. The recording method according to claim 23, wherein the optical storage media has a plurality of zones, the prepared data includes a plurality of data to be written into the corresponding zones.

28. The recording method according to claim 23, wherein the set of control register values is generated by a register writing circuit according to the control information.

29. The recording method according to claim 28, wherein the register writing circuit receiving a preparing status signal after the prepared data has been generated.

* * * * *